Figure 2:
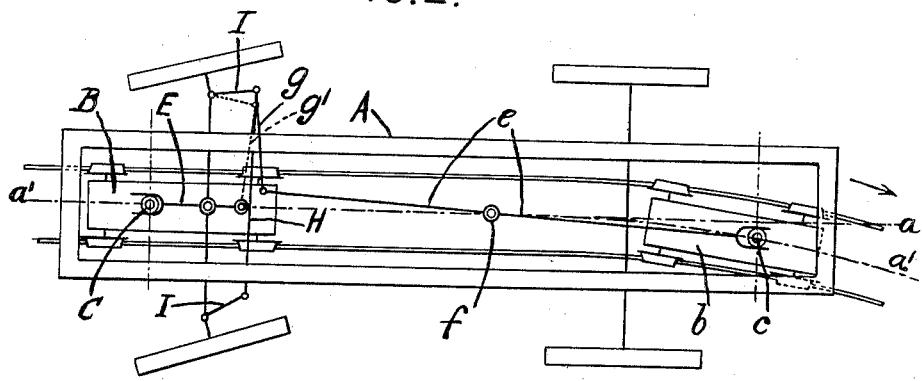

May 21, 1929.  J. ROBERTS  1,713,919
VEHICLE FOR SERVICE ON ROADS AND RAILS
Filed Dec. 8, 1926  15 Sheets-Sheet 1
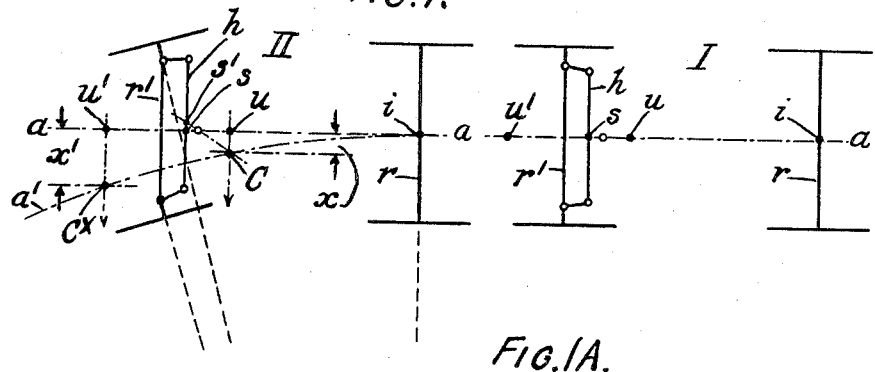
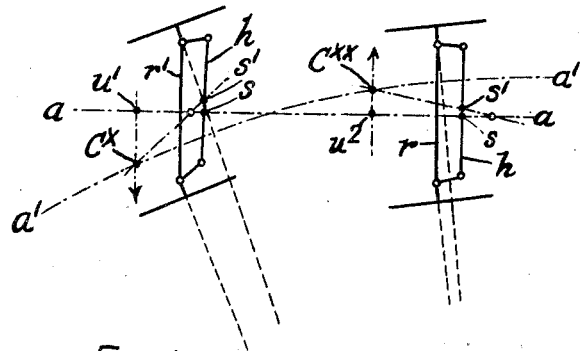
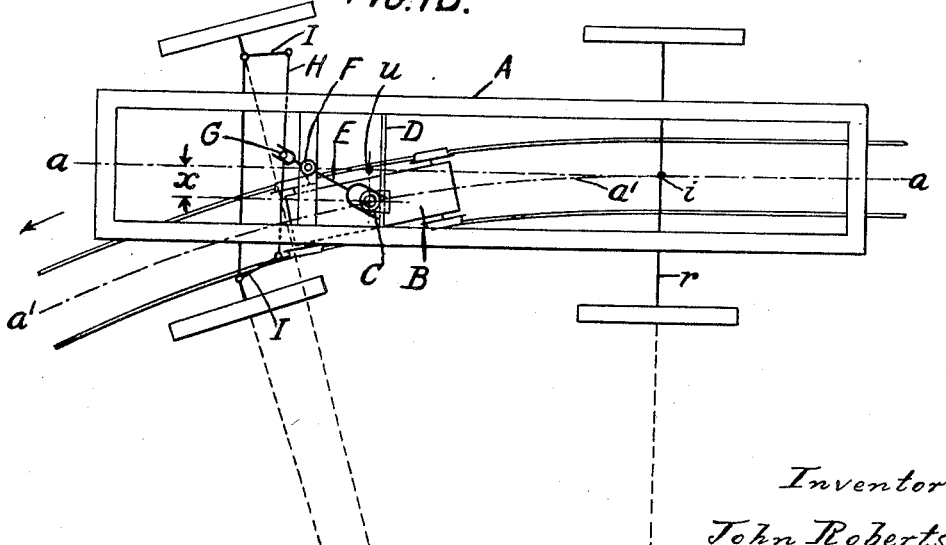
Inventor:
John Roberts
By
Attorney May 21, 1929.　　　　　J. ROBERTS　　　　　1,713,919
VEHICLE FOR SERVICE ON ROADS AND RAILS
Filed Dec. 8, 1926　　15 Sheets-Sheet 2

Inventor:
John Roberts
By
Attorney

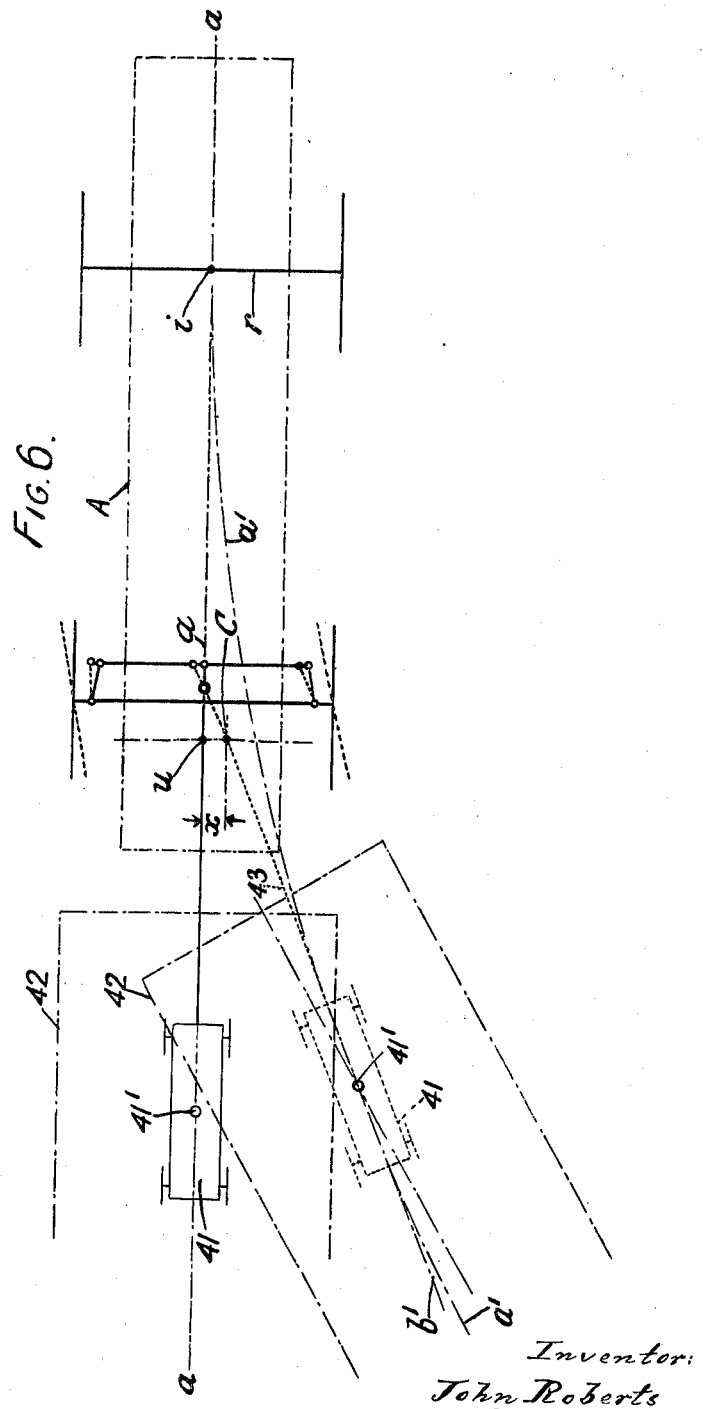

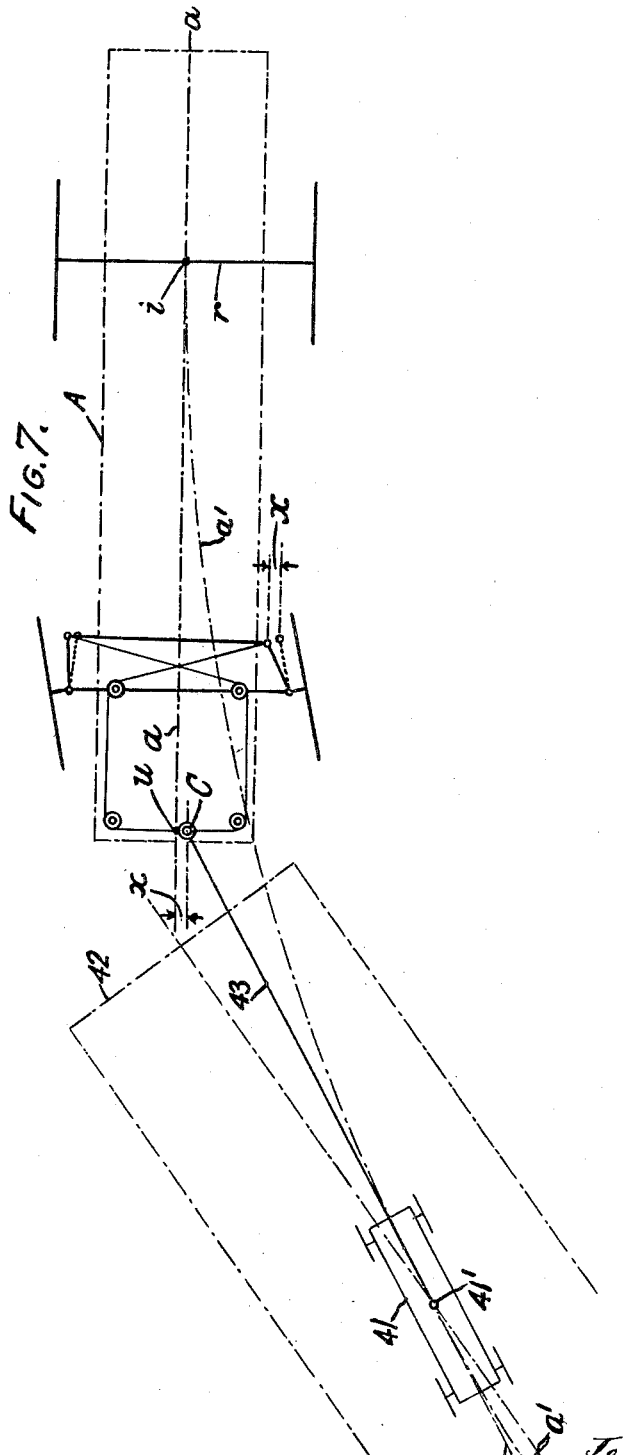

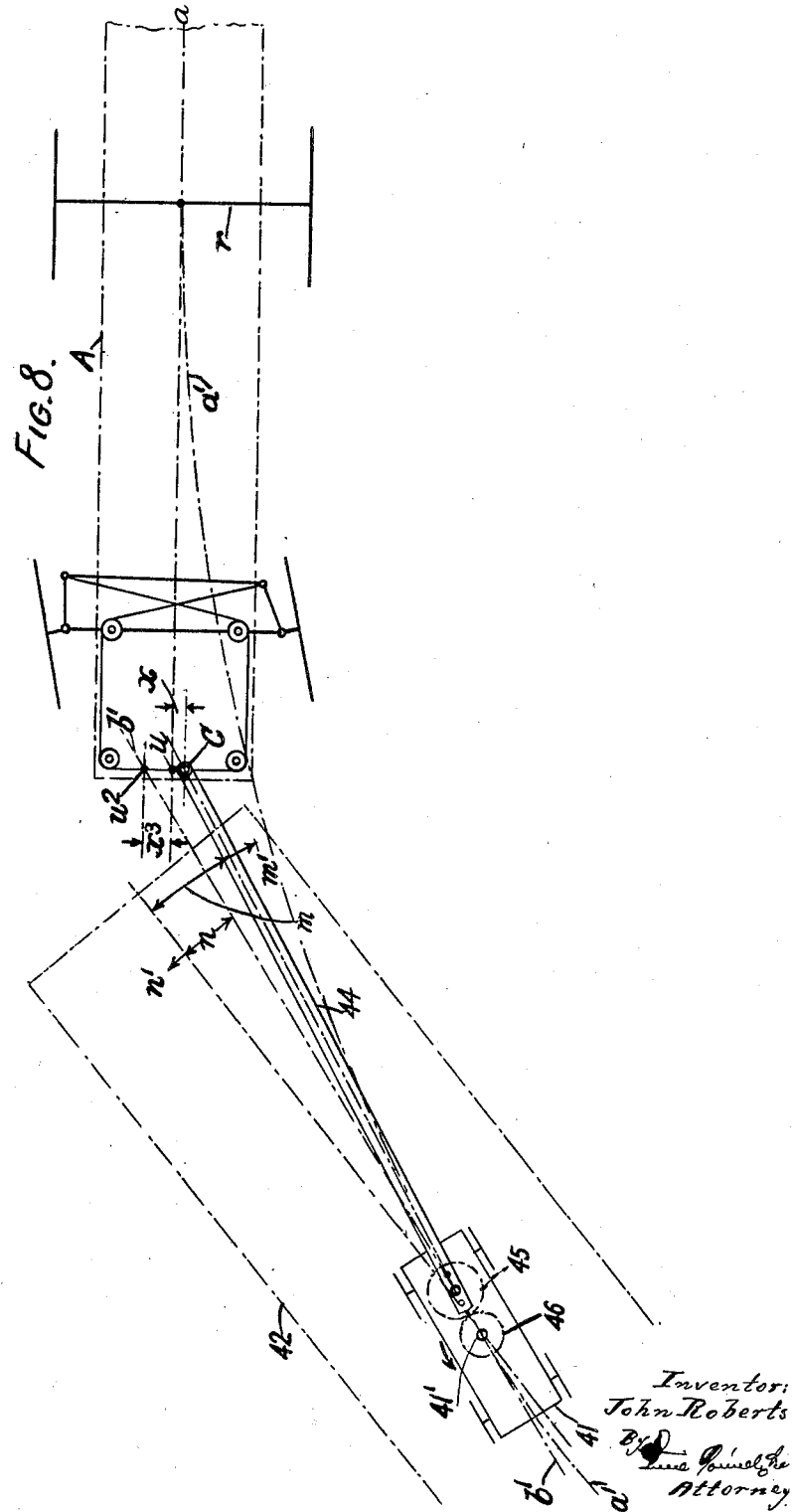

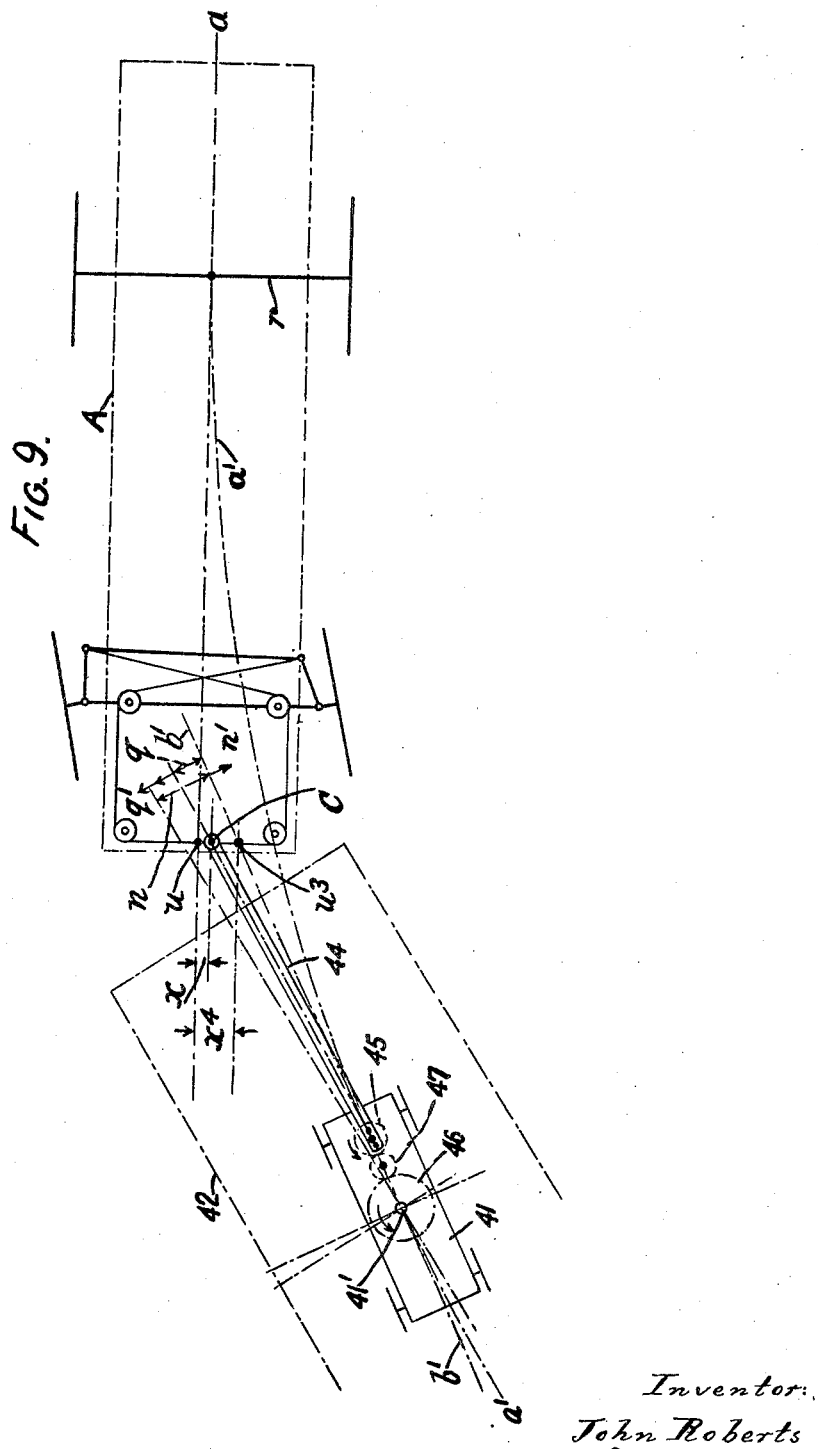

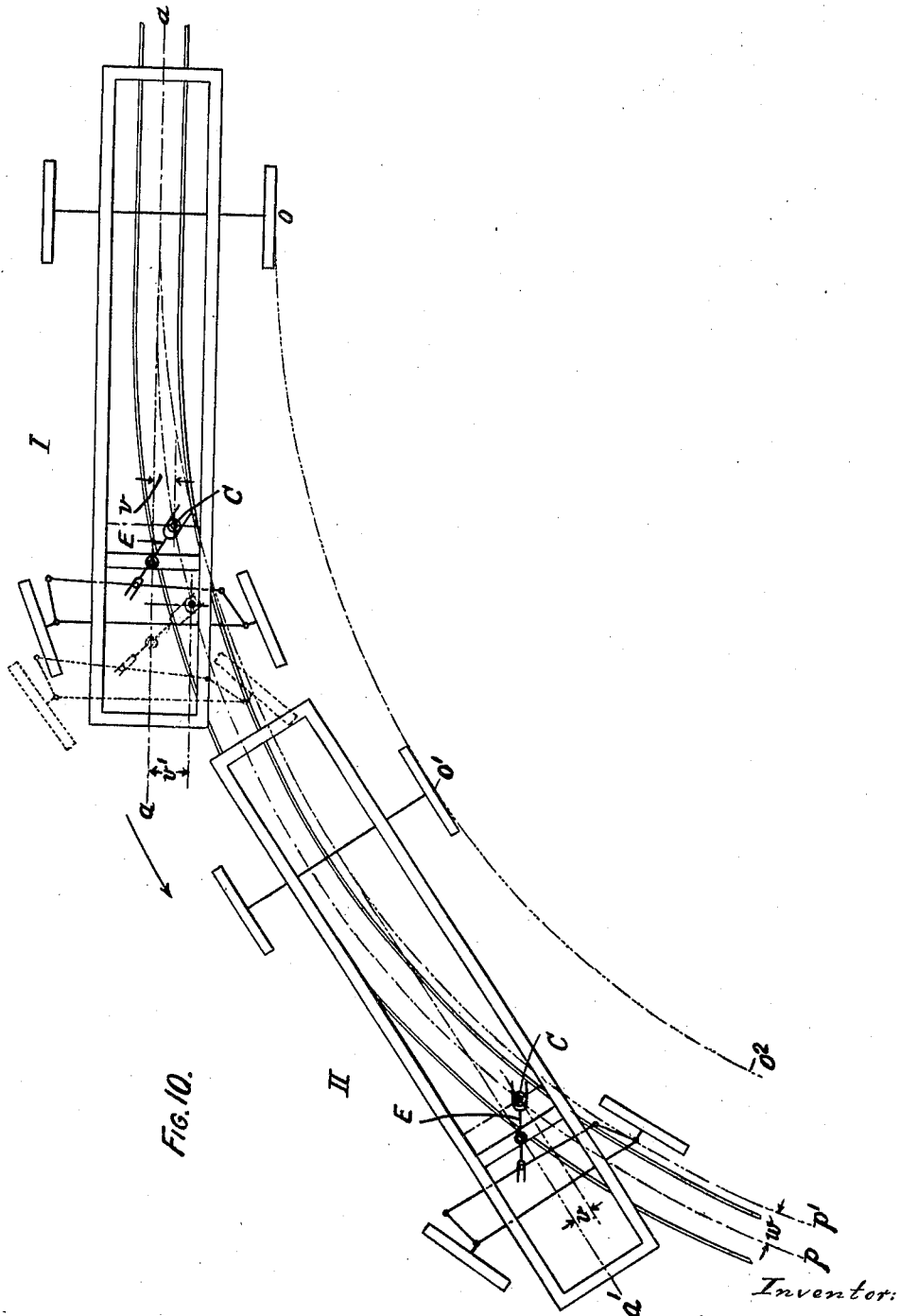

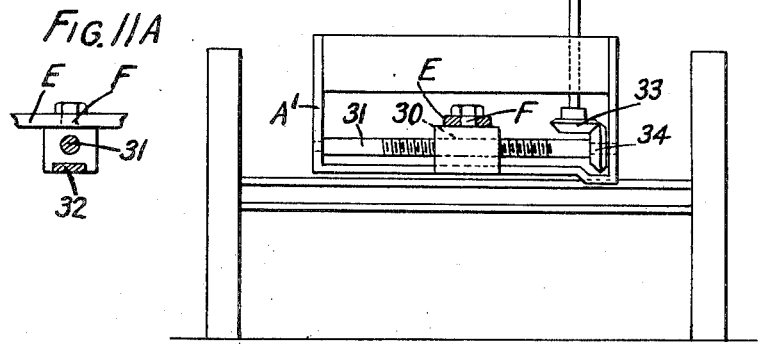
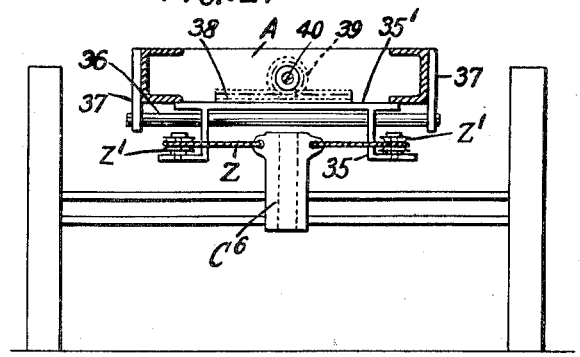

Inventor:
John Roberts
By [signature]
Attorney.

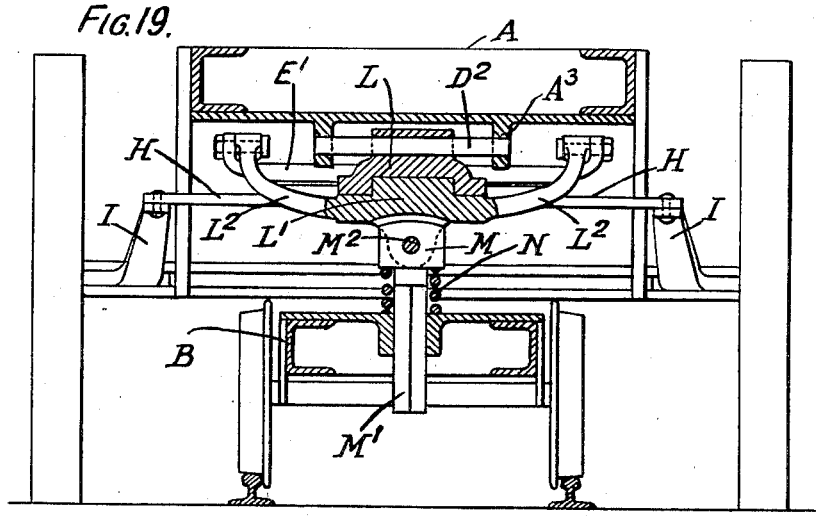
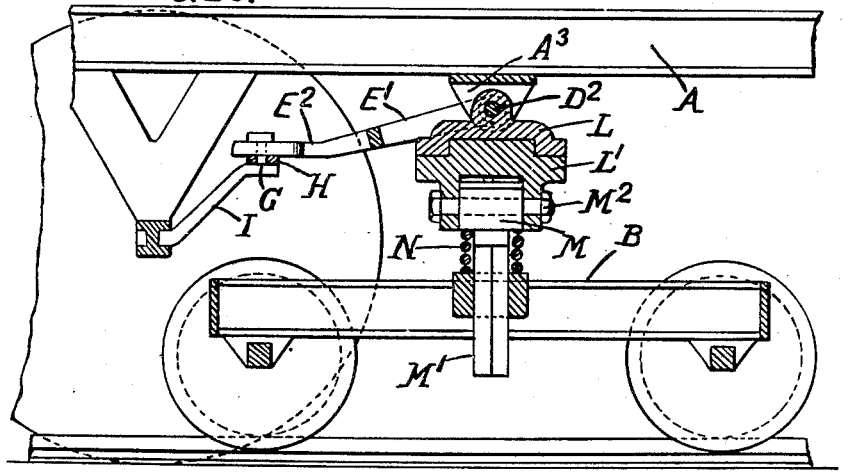
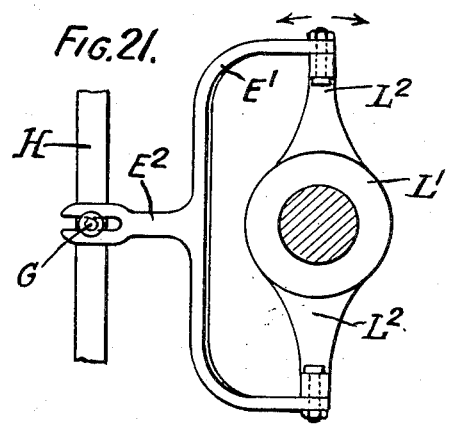

May 21, 1929.  J. ROBERTS  1,713,919
VEHICLE FOR SERVICE ON ROADS AND RAILS
Filed Dec. 8, 1926  15 Sheets-Sheet 15

Inventor:
John Roberts
By [signature]
Attorney

Patented May 21, 1929.

1,713,919

UNITED STATES PATENT OFFICE.

JOHN ROBERTS, OF LONDON, ENGLAND, ASSIGNOR, BY MESNE ASSIGNMENTS, TO THE NEW TRACTION COMPANY LIMITED, OF LONDON, ENGLAND, AN INCORPORATED ENGLISH COMPANY.

VEHICLE FOR SERVICE ON ROADS AND RAILS.

Application filed December 8, 1926, Serial No. 153,373, and in Great Britain February 23, 1926.

In vehicles designed for the purpose of running on a road and drawing trucks on rails (hereunder referred to as a roadrail vehicle), the connection now recognized as the most flexible appliance between the tractor or road vehicle proper and a rail bogie is a universal joint, the complementary parts of which are mounted on the road vehicle and the bogie respectively. Whereas in some prior arrangements these elements of the joint are local fixtures, they do not offer a sufficiently large range of pliability enabling excessive swaying of the tractor to be avoided, or the difficulty of proceeding around sharp curves without the rear wheels approaching too near to, or overriding, the rails, nor the impossibility of running in a reverse direction to be effectually overcome.

In order to obviate these disadvantages, it has been suggested to connect a roadrail vehicle in a similar way with rail bogies at each end, and to provide the vehicle with driving wheels located near but not exactly in the centre between the two bogies. This arrangement has the defect that in negotiating sharp curves the driving wheels are liable to skid, which, besides causing undesirable strains on the axles and parts of the mechanism, results in a loss of power and also reduces the tractive force at a moment when the latter should be a maximum (e. g. on sharp curves) owing to the fact that the dynamic coefficient of friction between driving wheel tires and the wheelway is less than the static coefficient. Moreover this arrangement has likewise the disadvantage of swaying.

Now in other arrangements it has been proposed to adopt a system in which four road wheels run on wheel ways and the front road wheels are steered by means of a bogie which is attached to the front of the vehicle by a universal joint, the complementary members of which are movable solely in a horizontal plane, a connecting rod forming part of one of the members of the universal joint and adapted to pivot in said horizontal plane being employed to transmit the transverse movement of the other member (i. e. the rail bogie) to the steering gear of the vehicle through the agency of further universal joints. Apart from the difficulties which the use of a relatively long connecting rod of this kind must obviously encounter in practice, it will be seen that this arrangement does not provide for any of the relative vertical movements between the bogie and the tractor which are so essential to the proper working of the system. Where, moreover, it is sought to employ the rotation of the bogie for steering, it is difficult to arrange mechanism so that the setting of the steering road wheels is correct for all degrees of curvature of the rails, and it is hardly possible to design mechanism which will ensure the correct setting of the steering road wheels when wear or play is present in the mechanism, or when any part of the mechanism is bent or otherwise damaged. Unless this disadvantage is overcome the road steering wheels are liable to proceed in a direction differing (less or more according to the wear, the play, and the design of the mechanism) from the direction for which they are set, and skidding may result which is apt to reduce the coefficient of adhesion between wheel and wheelway, throw a transverse load on the rails, increase the wear and tear on the steering mechanism, tend to de-rail the steering bogie, strain the various parts of the axle of the road wheels, cause wear of tires and wheelways, and a loss of power.

It is therefore essential that both relative transverse and vertical motion between the steering bogie and that part of the vehicle to which it is attached should be possible to a greater or less extent, and it is the object of the present invention to realize this in a practicable manner.

To this end, according to this invention, in using a road tractor as a rail traction vehicle and a rail bogie for automatically steering it along a rail track, the connection of the two vehicles is effected by a universal joint the companion members or complementary parts of which are respectively so associated one with the other as to enable them and their connections to perform relative vertical movements, one being pivoted and the other slidable on its vehicle and adapted directly or mechanically to transmit such displacements to the steering gear of the road vehicle in a properly co-ordinated manner.

By thus materially enlarging the range of flexibility, the arrangement according to this invention may be applied with equal facility to a four-wheeled lorry or tractor, of which the two rear wheels only are driven and the two front wheels steered, or to a four-wheeled lorry or tractor of which all four wheels are driven, or again to a lorry or tractor having more than four wheels, or to a lorry or tractor fitted with track laying devices and two or more steering wheels, as well as to a whole track vehicle.

As an example of the type of vehicles which may be employed in connection with the invention in practice the tractor may consist of four driven wheels all of which are steerable, and which are connected to the power unit through a combination or combinations of gears in such a manner that the speed of rotation of any of the wheels may vary relatively to allow the tractor to progress without skidding under any conditions of direction or turning. The road wheels are mounted in known manner as by swivelling stub axles to the main axles which are attached to the chassis of the tractor by springs and radius rods or torque tubes in any manner known to those familiar with the design of road vehicles. Situated in the vicinity of each of the axles of the tractor wheels and running on the rails there is a bogie. These bogies may be attached to the axles or other parts of the tractor by the joint connection according to this invention, for instance in one of the ways hereinafter more particularly described with reference to the accompanying drawings.

In these drawings the diagrams

Figs. 1 to 13 are illustrative of the manner in which, according to the invention, a road vehicle is steered under different working conditions by means of a bogie or bogies running on rails, and Figs. 14 to 25, hereinafter more fully explained, show various constructional examples of universal joint connections according to this invention whereby the rail bogie is connected to the road vehicle.

Before dealing with the various constructional forms shown in Figs. 14 to 25 as practical examples for the performance of the invention, and the diagrammatic illustrations showing a manner of their application, it will be desirable to explain the invention more generally by reference to Figs. 1, 1$^A$ and 1$^B$, which are diagrammatic examples of what may be termed the fundamental principle of its working.

In certain known arrangements, for instance in the "Ackermann steering system", the rear axle and the stub axles of the steering wheels assume each individually a radial position in relation to the curve negotiated for the time being.

When a four-wheel road vehicle, such as a tractor or lorry, used for the purposes set forth negotiates a curve under normal conditions, it is desirable, however, that the point of intersection of its longitudinal centre line with the rear axle travel perpendicularly above the centre line of the rail track, so that the rear wheels of the tractor run at equal distances on the inside and outside of the rail track.

According to the invention use is made of the particular relations referred to, or more particularly of the varying co-ordinate distance of the points of the curve from the centre line of the tractor, due to the tangential position of the latter.

Such positions of the road vehicle are illustrated in the diagrammatic plan view in Fig. 1, in which the road vehicle, indicated by its rear axle $r$, front axle $r'$ with steering cross rod $h$ and longitudinal centre line $a$—$a$ only, is shown in position I on a straight track and in position II as having entered so far on a curve $a'$ that its rear axle $r$ has reached the point of juncture between the curved and straight tracks. In order to set the steering wheels correctly for the particular curvature of the track it is necessary to displace the steering cross rod $h$ by a known predetermined amount, as for instance from $s$ to $s'$, as shown in position II. In this position the steering axle $r'$ has moved away from the centre line of the track in an outward direction. If now a control member of the universal joint connection of the two vehicles is arranged so that normally, when the vehicles are on a straight track, it is located on the centre line of the tractor, for example at the point of control $u$ (position I) and is adapted, in the advance of the vehicles on to a curve, by following the centre line of the track, to be moved in the direction of the co-ordinate $x$ toward the centre of curvature, from the point of control $u$ to the point C (position II) this co-ordinate or deflection $x$ can easily be determined by calculation from the known factor or distance of point $u$ from the point $i$ of the rear axle, and be translated by any suitable means into the deflection $s$—$s'$ of the steering cross rod $h$ for setting the steering wheels. While the point of control $u$ is shown by way of example behind the steering axle it can equally well be placed in front thereof, for example at $u'$, when the co-ordinate deflection of the movable control member $C^x$ of the universal joint connection is of an amount $x'$ which likewise can be translated by appropriate means into the amount $s$—$s'$ for the actuation of the steering cross rod $h$.

For the purpose of this description the movements performed by any part or point of the road vehicle away from the centre of curvature will hereinafter be referred to by the term "positive stray" while those in the opposite direction, i. e., towards the centre of curvature, will be termed "negative stray". It will thus be seen that in steering by means of the front or steering axle $r'$, both in forward and backward steering, the front axle, due to the tangential position of the centre line of the vehicle, is subject, as for instance shown in position II, to a positive stray, while the movable control member will be displaced from the point $u$ to the point C and the front of the steering wheels will be turned in the same direction. For steering a back axle, however, the stray of the axle may be negative and the deflection of the movable control member from point $u^2$ to point $C^{xx}$ will be positive so as to turn the steering wheels in the same direction, as shown in Fig. 1$^A$.

If it should be desired to give the rear axle a negative or a positive stray, the centre line of the tractor will assume a tangential position in relation to a curve parallel to centre line of the track of smaller or greater radius respectively, the co-ordinates of which parallel curve determine the stray of the point of control in a like manner to that described in connection with Fig. 1, and as will hereinafter be more fully explained.

Fig. 1$^B$ shows in a more complete diagrammatic plan view a tractor A in the position II of Fig. 1 and a bogie B connected thereto by means of the complementary parts of a universal joint C, in such manner that, while the member of said joint attached to one of the two vehicles is maintained in a locally fixed position thereon, the member of this joint attached to the other vehicle is adapted to perform varying movements substantially at right angles to the centre line of the vehicle upon which it is mounted. In the case shown in Fig. 1$^B$ the universal joint C, of which as stated various constructional forms will be more fully described hereinafter, is mounted as to one part in a locally fixed position on the longitudinal axis of the bogie B, while the movable part thereof is mounted on the tractor A so as to be slidable and rotatable on or with a rod D (as will be hereinafter described) arranged transversely to the longitudinal axis $a$—$a$ of the said tractor. A two-armed lever E suitably pivoted on the tractor frame at F engages with the forked ends of its arms respectively the movable member of the joint C and a pin G provided on the steering cross rod H which connects the stub-axle steering arms I of the steering wheels of the tractor.

On a straight track the centre lines of tractor and bogie are situated in the same vertical plane so that the three points C, F and G and the lever E are likewise located in that plane. In the advance of the tractor from the straight to the curve (i. e., towards the left in the drawing), the bogie attached thereto follows the curve and gradually moves the movable member of the universal joint C away from its zero position in the point of control $u$ on the centre line $a$—$a$ of the tractor. In this movement the lever E is swung about its fulcrum F by the movable member of the universal joint C so that the steering wheels are gradually turned until they assume the position necessary for correct steering of the tractor along the particular curve, which is determined by the amount of deflection or stray $x$ of the point of control $u$ from the centre line $a'$ of the rails. The steering wheels being thus set to follow concentric paths to the curve of the track, the amount $x$ will remain constant in a curve of constant curvature, but will vary with the radius of curvature.

The above function of a universal joint in its action on the parts through which the steering is to be controlled in the manner described may be realized in an efficient and reliable manner by adopting any of the constructional forms shown in Figs. 14 to 25 now to be described although it will be obvious to those skilled in the art that numerous other forms may be readily devised and that therefore the invention must not be deemed to be limited to the specific devices herein more particularly referred to.

Figure 14:
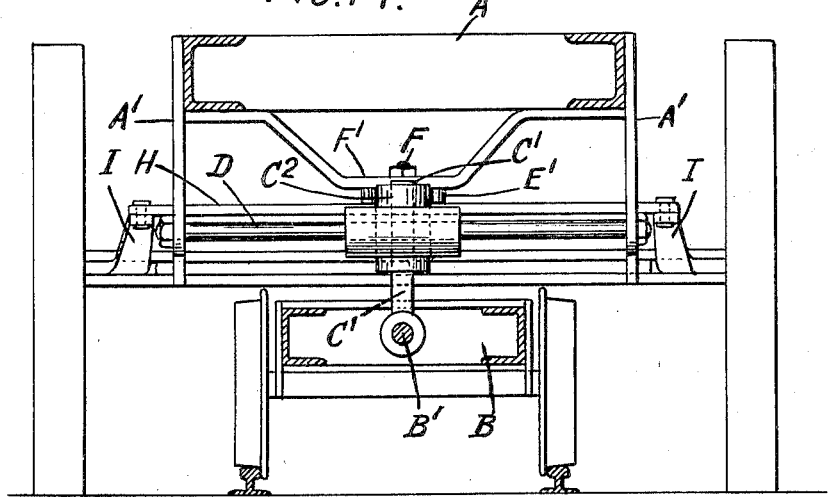
Figure 15:
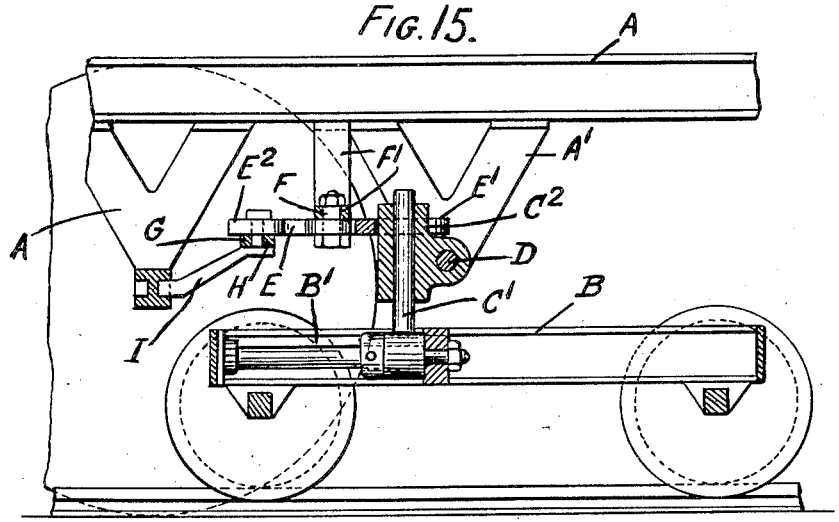
Figure 16:
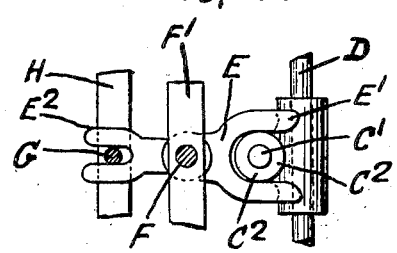

According to the construction shown in Figs. 14, 15 and 16 (Fig. 14 showing a transverse section of the two vehicles taken through the universal joint connections, Fig. 15 a section at right angles thereto, and Fig. 16 a detail plan view) the connection of the rail bogie B to the road tractor A comprises an upstanding plunger C', mounted on a spindle B' arranged in a vertical plane through the longitudinal centre line of the bogie B and adapted to swing in a vertical plane at right angles thereto. This plunger C' projects into a cylinder C$^2$ slidably and rotatably supported on a transverse rod D mounted in hanger brackets A' secured to the frame of the tractor A. Alternatively the rod D may be rigidly secured to the cylinder C$^2$ and be slidably and rotatably journaled in the hangers A'. A two-armed lever E pivoted at F on a yoke F', engages with its forked free ends E' and E$^2$ respectively the cylinder C$^2$ and a pin G fitted in the steering cross rod H, which connects the two stub axle steering arms I. The plunger C', when the bogie B deviates from the course of the tractor A, causes the cylinder C$^2$ to slide transversely on the rod D, whereby the lever E is swung about its pivot F and by means of the steering cross rod H actuates the stub axle steering arms I. Apart from this lateral displacement of the cylinder C$^2$, the swivelling arrangement of the plunger C' in one plane, its rotary relation to the cylinder C$^2$ and the rotary freedom of the latter in a plane at right angles to the aforementioned plane, enable the two members to accommodate themselves and take up, without strain, any irregular movement of the tractor or the bogie.

Figure 17:
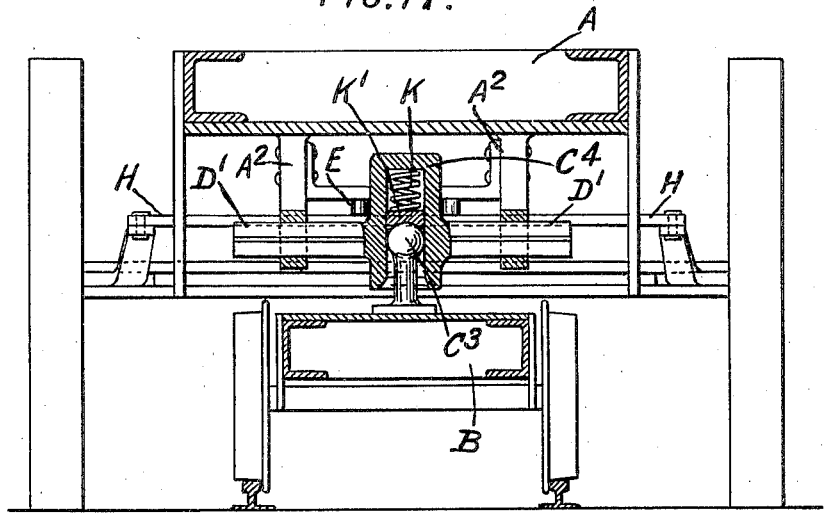
Figure 18:
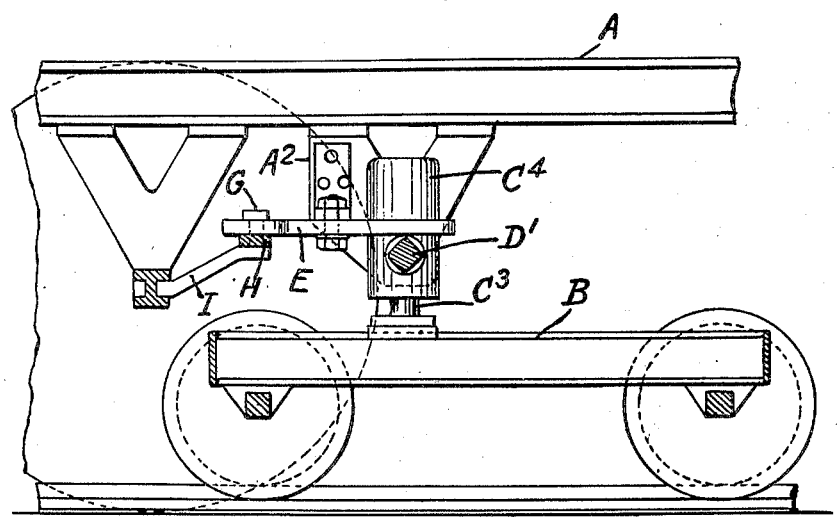

Fig. 17 in a transverse section of the vehicles through the universal joint, and Fig. 18, in a section at right angles thereto show an alternative construction of the universal joint comprising in this case a ball and socket joint connecting the rail bogie B to the rail tractor A. A spherically headed member $C^3$ is rigidly mounted in the longitudinal centre plane of the bogie B, while a co-operating socket or cylinder $C^4$ is supported by means of transversely extending arms D', which are slidably but not rotatably fitted in hangers $A^2$ secured to the frame of the tractor A. The lateral sliding movements of the cylinder $C^4$, produced by the ball members $C^3$ during deviations of the bogie from the course followed by the tractor A, are transmitted to the steering wheels by means of lever E, steering cross-rod H and stub-axle steering arms I in an exactly analogous manner as in the preceding example. If it is desired that the bogie B shall carry part of the load of the tractor A, the cylinder $C^4$ may be supported on the member $C^3$ by means of a spring K and a block $K^1$ interposed between the latter and the member $C^3$.

In another modification of the means for connecting the rail bogie B to the tractor A, shown in similar representations in Figs. 19, 20 and 21, a transverse rod $D^2$ supported in Brackets $A^3$ on the tractor frame carries slidably and rotatably mounted on it one member L of a rotary spigot joint. The supplementary member L' of this joint is adapted to turn on member L about a vertical axis intersecting the axis of the rod $D^2$ at right angles, and is pivotally supported on the head M of a stem M' so as to be free to swing about a pivot pin $M^2$ carried by the said head M parallel to the longitudinal centre line of the bogie B. The stem M' is mounted vertically slidable but not rotatable in a bearing provided therefor on the longitudinal centre line of the bogie, and the head M of the stem M' is supported on a spring N to maintain the members L and L' of the spigot joint in proper engagement. Incidentally the spring N may be chosen of such strength as to transmit part of the load of the tractor to the bogie. Alternatively the stem M' may be rigidly secured to the bogie. On arms $L^2$ the member L' carries, so as to be free to pivot thereon about an axis in alignment with the axis of the rod $D^2$, a yoke E' (Fig. 21), a forked stem $E^2$ of which engages the pin G provided on the steering cross rod H. In the angular deflections of the bogie B the member L' performs a rotary movement in relation to its companion member L, so that the yoke E' is swung by the arms $L^2$ about the vertical axis of the spigot joint and thereby actuates the steering cross rod H, while the member L, being free to slide on the rod $D^2$, joins in the lateral displacement of the member L'.

Figure 22:
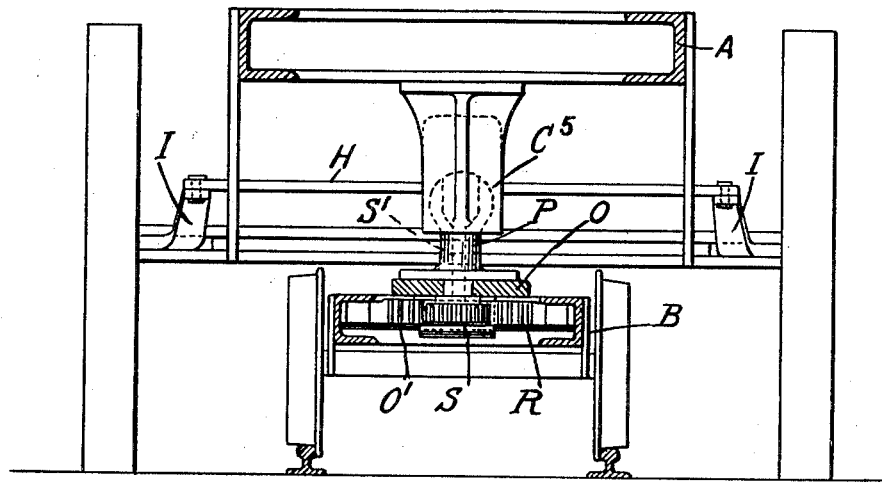
Figure 23:
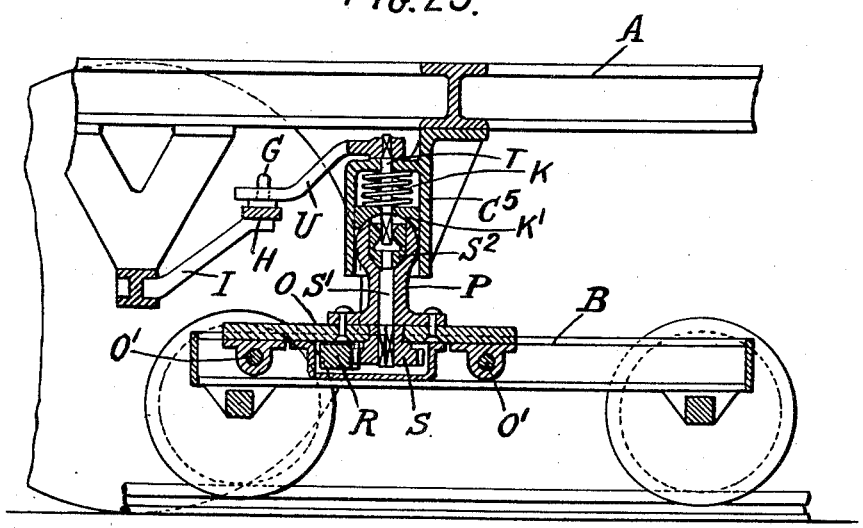

Fig. 22 in a transverse section through the joint connections and Fig. 23 in a right angle section thereto illustrate means for connecting a steering bogie to a tractor, wherein in contradistinction to the previous examples the movable member is mounted on the bogie and the member mounted on the tractor is in a permanent position. A saddle O is slidably mounted on rods O', which are fitted transversely in the frame of the bogie B so as to enable the saddle O to perform transverse sliding movements thereon. The saddle O carries rigidly secured to its top a spherically headed member P adapted to co-operate with a cylinder $C^5$ which is rigidly secured on the underside of the tractor on the centre line thereof. Between and parallel to the rods O' the bogie frame has fitted to it a rack R adapted to co-operate with a pinion S journaled in the saddle O in axial alignment with the spherically headed member P. The shaft S' of the pinion S extends co-axially through the said member P. At its upper end the shaft S' carries a block $S^2$ in which is formed a square socket to form a union for the squared end of an extension shaft T running co-axially with shaft S' through the cylinder $C^5$. In order not to interfere with the universal movements between the member P and the cylinder $C^5$ the socket in the block $S^2$ is bell-mouthed both outwardly and inwardly. The shaft T at its free end which projects from the cylinder $C^5$ carries a lever arm U in engagement with the pin G on the steering cross rod H. In the angular deflection of the bogie B from the course of the tractor, the saddle O remains stationary but the rack R moves with the bogie and imparts rotary motion to the pinion S and the shafts S' and T, which is translated by the lever arm U into the rectilinear motion required to operate the steering cross rod H and the stub-axle steering arms I.

If the setting of the steering wheels should not be correct, the saddle O and the spherically headed member P are caused to move transversely, thereby imparting additional movement to the steering mechanism.

If it is desired to transmit part of the tractor load upon the bogie B, a spring K supported on the spherical head of member P by means of a block K' may be arranged in the cylinder $C^5$.

Figure 24:
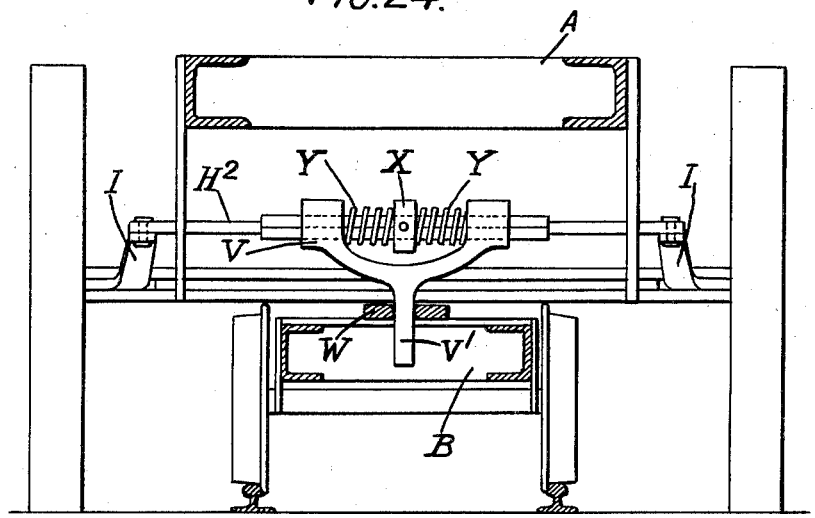

Fig. 24, in a transverse section of the vehicle through the joint connection, illustrates an example in which the steering cross rod $H^2$, which connects the stub-axle steering arms I, is directly actuated by a member of the universal joint. A yoke V is slidably but not rotatably mounted on the steering cross rod H², and by means of a substantially radial stem V' engages a double bell-mouthed or substantially hyperbolic hole in a plate W, which is rigidly secured to the top of the bogie B. A set collar X is fixed on the cross rod H² centrally between the arms of the yoke V, and buffer springs Y are interposed between the said arms and the said set collar. Any transverse deflection of the bogie B is thus directly transmitted elastically to the cross rod H² through the yoke V and either of the springs Y.

Figure 25:
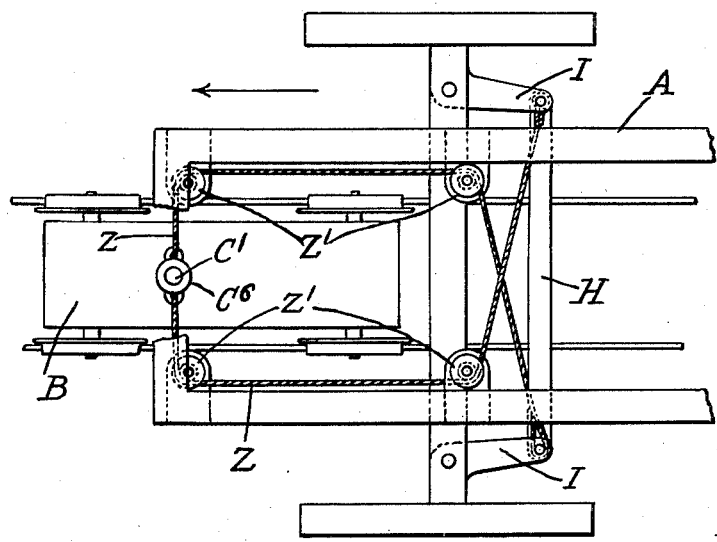

Fig. 25 shows in a plan view yet another method of connecting a bogie B to a tractor A. The bogie is rigidly fitted with a plunger C'. A cylinder C⁶ is suspended in a wire rope or cable Z or the like, which is carried over rollers Z', suitably mounted on the frame or on brackets secured to the tractor along the opposite sides thereof, and the free ends of the cable are attached to the stub-axle steering arms I (connected by the steering cross rod H) on the opposite side of the rollers over which it is carried. The cable Z and the steering cross rod H thus form, as it were, an endless band so that when the bogie deviates from the course followed by the tractor and displaces the cylinder C⁶ the steering wheels are set by the cable at the corresponding angle. The diametrically opposite points of attachment to the cylinder C⁶ of the wire rope Z constitute, as it were, a universal joint, the flexibility of the rope and the floating condition of the cylinder carried thereby allowing the cylinder sufficient movement in any direction.

Reverting now to the application of the invention as shown on the further diagrammatic illustrations in Figs. 2 to 10 it will be noted that, whereas in connection with Fig. 1 forward movement alone of the tractor was taken into account, somewhat different conditions and requirements have been borne in mind in connection with the remaining diagrams.

Fig. 2 shows in plan view the same four wheeled tractor as Fig. 1 having one pair of steering wheels, provided, however, with mechanism for steering both in its forward and backward movement. This is effected by the use of two rail bogies, one, B for forward steering and the other b for backward steering. The point of control C for forward steering is arranged in front of the steering axle and the point of control c for backward steering at the rear of the back axle. The tractor A is assumed to run backward (to the right of the drawing) and the drawing shows the rear bogie b having entered from the straight on a curve. The stray of the point of control produced by the deviation of bogie b from the course of the tractor A causes the two-armed lever e (extended here well to the front) to swing about the pivot f and, by means of the link g connecting it to one of the stub-axle steering arms, to actuate the steering gear H, I, I of the tractor. The corresponding link g' (shown in dotted lines in its normal position) connecting the control lever E of the front bogie B to the steering gear of the tractor has for this purpose been disconnected, so that the arrangement for forward steering is inoperative. Instead of disconnecting the link g or g', one of these links only may be provided and be so arranged that it is connected up, preferably under control of the engine reversing mechanism of the tractor, either to the lever E or the lever e in accordance with the driving gear of the tractor.

Figure 3:
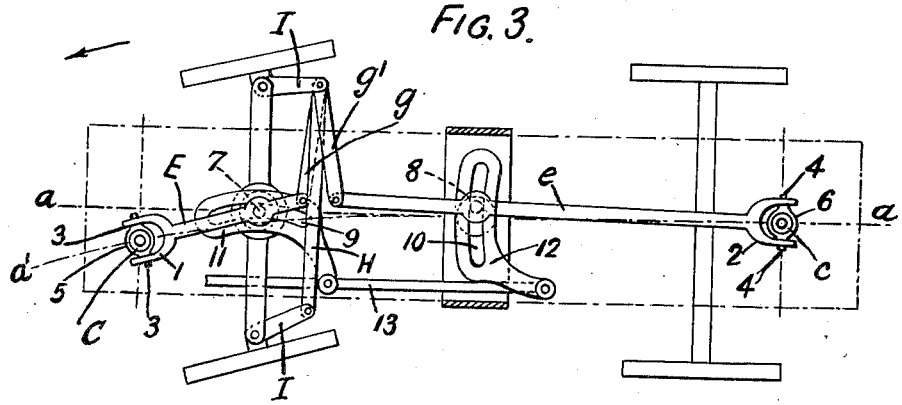
Figure 3A:
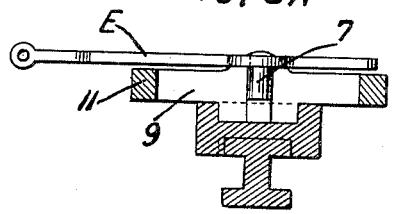

A specific arrangement, designed to attain the last mentioned object, is shown in Figs. 3 (plan view) and 3ᴬ, the latter illustrating a detail in vertical section on an enlarged scale through the steering axle along the centre line a—a of the tractor, the bogies being omitted for the sake of clearness. The control cylinders C and c together with the levers E and e, links g and g', steering cross rod H, and stub-axle steering arms I, I, are arranged substantially as shown in Fig. 2, with the difference, however, that on the one hand the forks 1 and 2 respectively of the levers E and e are not loosely embracing the control cylinders C and c, but are pivotally mounted on trunnions 3, 3 and 4, 4 of straps or yokes 5 and 6 respectively which are rotatable on the said cylinders. On the other hand the pivot pins 7 and 8 of the levers E and e are not fixed in stationary positions but are rigidly secured in the respective levers themselves and engage cam slots 9 and 10 provided in levers 11 and 12 respectively, which are rotatably mounted in place of the pivot pins and connected together by a link 13. The link 13 is connected by any suitable means to the reversing mechanism of the tractor, so that when the latter is operated the levers 11 and 12 are swung through an angle of 90°. The cam slots 9 and 10 are arranged substantially at right angles to each other, so that when one is substantially parallel to the longitudinal axis of the tractor the other is placed transversely thereto. When either the cam slot 9 or the cam slot 10 is placed in a longitudinal direction it locates the pivot pin 7 or 8, steadying the same in position to serve as a fulcrum to the lever E or e respectively, while when either of said cam slots is set in a transverse direction it allows the pivot pin 7 or 8 to take part in the swinging movements of its respective lever E or e to render its connections ineffective for the time being. In the drawing the tractor is assumed to be running forward (to the left) on to a curve indicated by the centre line $a'$ of the rail track, and it will be seen that the pivot pin 7 is located and steadied by the cam slot 9 so that it serves as an effective fulcrum to lever E when setting the steering wheels in accordance with the stray of the point of control. In this operation the link $g$ has also been operated, and inasmuch as the cylinder $c$ is positively positioned by its control bogie while the cam slot 10 of the lever 12 has been set into inoperative or transverse position, the lever $e$ with the pin 8 is free to be swung by the link $g$ about the axis of the control cylinder $c$. Should it be desired in a vehicle with more than two steering wheels to lock any of the stub axles for road work when the bogies B, $b$ are detached, the levers 11 and 12 may be swung into a position intermediate of the two operative positions thereof. Should it be desired however, to free both cylinders C and $c$ and place the actuation of the stub axles under the sole control of the hand steering gear of the tractor, both levers 11 and 12 will be set so that their cam grooves 9 and 10 take up a transverse position. Obviously for this purpose it will be necessary to provide means for setting the levers 11 and 12 individually.

Figure 4:
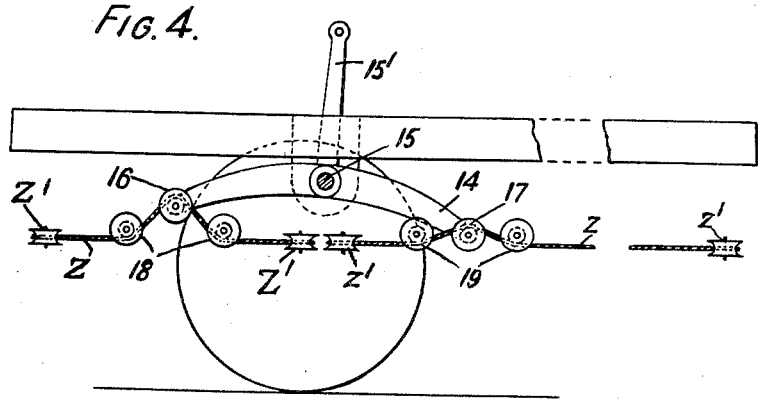
Figure 5:
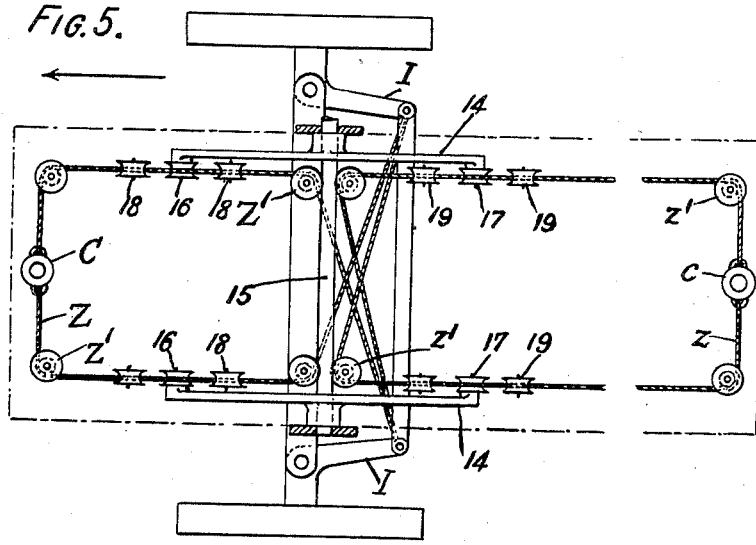

Figs. 4 and 5 illustrate (with the bogies and other parts omitted for the sake of clearness) in lateral elevation and plan view respectively an arrangement for forward and backward steering of the kind shown and described in relation to Fig. 25. The control cylinders C and $c$ are each interposed in separate cables Z and $z$ which are carried over pulleys Z' and $z'$ respectively and attached to the stub axle steering arms 1. In order to render one or the other of these steering arrangements operative, means are provided whereby simultaneously the other steering arrangement is rendered inoperative. This is effected by tightening the cable of the one and slackening the cable of the other. For this purpose a pair of two-armed levers 14 is provided, mounted one at each side of the tractor on a common transverse shaft 15 each lever being fitted at one end with a tension pulley 16 placed in the train of pulleys of the cable Z for forward steering and at the other end with a tension pulley 17 placed in the train of pulleys of the cable $z$ for backward steering. Suitable guide pulleys 18 and 19 are in addition arranged for the cables Z and $z$ respectively. The controlling shaft 15 is adapted to be rocked by means of a lever 15', which is connected preferably to the reversing mechanism of the tractor in any suitable manner, so that in setting the driving gear of the tractor to forward or reverse, the shaft 15 is rocked and the cables Z and $z$ tightened and slackened respectively by the tensioning pulleys 16 and 17 and thus brought into an operative or inoperative condition, as clearly shown in Fig. 4, so as to transmit the deflections of the cylinder C or $c$ imparted to it by the front or the rear bogie, as the case may be, to the steering gear of the tractor. Spring loaded pulleys may be used for taking up the slack in the inoperative cables. It is to be understood, of course, that the cable mechanisms represented in Figs. 4 and 5 and in Fig. 25 can be employed with various other forms of universal joints, particularly that represented in Figs. 14 and 15 and recited in certain of the appended claims.

The diagrammatic plan views Figs. 6 to 9 are illustrative of a method and means whereby the steering according to the invention of a four-wheel road vehicle having two steering wheels may be effected by an outside rail bogie, as for instance, the bogie of a truck coupled to the road vehicle. This may, according to the invention, be effected by means of a steering arm attached to the bogie and detachably connected to the floating universal joint connection of the two vehicles. Such steering arm may be rigidly fixed to the bogie, or may be adapted, in addition to the movements it performs bodily with the bogie, to perform horizontal swinging movements in one or the other direction.

When the two vehicles negotiate a curve in the rail track the two longitudinal centre lines assume tangential positions in relation to the rail track curve, so that their point of intersection is equidistant from the rear axle of the tractor and from the king pin of the truck bogie. If now the point of control is so located on the centre line of the tractor that the length of a co-ordinate from this point to its point of intersection with the centre line of the bogie, corresponds to the stray of the point of control which, as hereinbefore explained, is required to set the steering wheels at the correct angle corresponding to the curve of the track, the length of the steering arm can be definitely determined. This length varies and is determined by the distance of the point of control from the rear axle and the amount of stray of the latter.

In Fig. 6, the point of control $u$ as hereinbefore described in connection with Figs. 1 and 14 to 16, is located in proximity of the steering axle in front thereof, while Fig. 7 shows the point of control $u$ of the cable gear type as described in connection with Figs. 4, 5 and 25, arranged at the extreme forward end of the tractor. If in either Fig. 6 or Fig. 7 the cylinder C is caused to move from point $u$ to point C by the amount $x$, required in each instance for the correct setting of the steering wheels, the centre line $b'$ of the bogie 41 and its steering arm 43 must pass through the said point C and the distance between the point C and the king pin 41' of the bogie, which is the tangential point of line $b'$, can be determined. It will be seen that this distance is approximately equal to the distance of the point of control from the point of intersection $i$ of the centre line $a$—$a$ with the rear axle $r$ of the tractor, and that in consequence of this in the example of Fig. 6 the distance of the bogie 41 from the tractor A is considerably less than the corresponding distance shown in Fig. 7. It will also be readily understood that the arrangement shown in Fig. 6 would not permit of the coupling of a tractor with a truck or other vehicle with an overhang over the king pin exceeding a certain limit, while on the other hand with the arrangement in Fig. 7 it is of course quite possible to couple vehicles with a short overhang, although complications in regard to the draw bar would arise.

It is therefore the object of the invention to provide means which will enable the length of the steering arm to be exclusively determined by the overhang of the truck over the king pin of the steering bogie, in combination with the overhang of the tractor front over the point of control, that is to say, enable the steering arm of the rolling stock, no matter what the overhang may be, to be adapted to the particular construction of the propelling vehicle.

If the steering arm is longer than the distance from the point of control to the rear axle, the point of intersection of the centre lines of the two vehicles (tractor and steering bogie) is brought forward as regards the tractor and farther away from the curve, so that a rigid steering arm would move the cylinder in a positive instead of a negative direction, thereby causing the vehicle to follow a curve of greater radius than that of the rail track.

Fig. 8 illustrates such a case and the means whereby this discrepancy can be corrected. These means consist of a train of gears 45, 46 of which gear 46 is rigidly secured to the underside of the truck frame concentrically with the king pin 41' of the bogie 41, while the gear wheel 45 is journaled on the centre line of the bogie, so that in any angular displacements between the truck 42 and bogie 41, the wheel 45 is actuated in the manner of a planet wheel and rotates in the opposite direction to the fixed wheel 46. The steering arm 44 is rigidly secured in a radial position on the gear wheel 45, so that in the rotary movements of the latter it is caused to perform corresponding oscillatory movements in a horizontal plane.

When the bogie 41 of a truck such as 42 enters on a curve its centre line $b'$ assumes a tangential position in relation to the centre line $a'$ of the rail track curve and has a tendency to move the point of control $u$ with a positive stray $x^3$ to the point $u^2$. This tendency however is counteracted by the gears 45, 46. The truck 42 in adjusting itself to the curve, causes its rear end to be swung out about an angle say of an amplitude $n$ in the direction of arrow $n'$, but in this movement the wheel 46 rotates the wheel 45 in the opposite direction so that the arm 44 is swung through an angle $m$ in the direction of arrow $m'$, the ratio of gearing between the wheels 45 and 46 being so determined as not only to balance the positive stray $x^3$ of the centre line $b'$ of the bogie, but also to impart to the control member C its required negative deflection $x$, that is to say the angle $m$ must correspond to a displacement of control member C equalling $x^3$ plus $x$.

If as shown in Fig. 9 the steering arm 44 is shorter than the distance of the point of control $u$ from the rear axle $r$, and the point of intersection of the centre lines $a$ and $b'$ of the two vehicles (tractor A and steering bogie 41) is in the rear of the point of control $u$, the co-ordinate of the latter, which should correspond to the stray $x$ required for the setting of the wheels, is increased in length to the amount $x^4$ so that consequently the movement of the control member C is excessive.

In order to counteract this excessive movement a train of gears 46, 45, similar to the example of Fig. 8, 46 being mounted rigidly on the truck 42 and 45 rotatably on the centre line $b'$ of bogie 41, is used which additionally comprises an idler 47 likewise journaled on the centre line $b'$, whereby the rotary movements of the gear 46 are transmitted to the gear 45 in such a way that the two wheels 45 and 46 are rotated in the same direction (as indicated by arrows) so that the steering arm 44 is swung back through an angle $q$ in the direction of arrow $q'$ and reduces the stray $x^4$ to its correct proportion $x$ as shown by the position of cylinder C.

Instead of driving the tractor astride of the rail track it may also be driven aside of a rail vehicle and the steering gear may be controlled by a pole such as is commonly used for pole shunting, said pole projecting laterally from said vehicle and being connected independently to the cylinder C and the draw bar of the vehicle.

Fig. 10 relates to cases in which a tractor has a particularly long wheel base or has particularly sharp curves to negotiate. In either event the front wheels must necessarily be steered wide, so that, in order to keep the back wheels centrally astride of the rail track, the front wheels are apt to run on to and over the rails. This for various reasons is objectionable. The remedy, according to the invention, is found in allowing the tractor, during its negotiation of the curve, to approach the centre thereof, i. e., to allow to the rear axle of the tractor a negative stray of such an amount as to enable the front wheels to run astride and clear of the rail track. To attain this, it is necessary to so construct and proportion the steering mechanism that, when a tractor in moving forward enters from the straight on a curve, the cylinder C is so displaced by the bogie (not shown) that the amount of its deflection $v$, at which the steering wheels are set to the correct angle for the curve, is reached before the rear axle of the tractor passes over the junction of the straight track with the curve. Such a position is shown in full lines at I in Fig. 10. In the further advance of the tractor say for example into the imaginery position in which the front axle, cylinder C and steering wheels assume the imaginery positions shown in dotted lines, the deflection of the cylinder C has a tendency to increase to the amount $v'$. This position, however, is never attained, inasmuch as the said tendency has the result of setting the steering wheels at an angle which causes the front of the tractor to be brought back nearer to the centre of the curve, until the normal deflection of cylinder C for the particular curve is reestablished (see position II, Fig. 10) and consequently the setting of the steering wheels instantly rectified. This temporary excessive turning of the steering wheels has the effect of causing the rear wheels to cut the corner approximately along the curve $o—o'$ when they follow a path $o'—o^2$ concentric with the track. The stray $w$ of the rear wheels is measured by the displacement of the point of intersection of the rear axle with the centre line of the tractor from the centre line of the track and varies in inverse ratio to the radius of the curve. It will be noticed that the centre line $a—a$ of the tractor has been moved inwardly by the amount of the stray $w$ from its normal tangential position to the centre line $p$ of the rail track curve into a parallel position $a'$ tangential to a curve $p'$ of smaller radius, which is parallel to the rail track centre line $p$.

It may become necessary to provide for a displacement of the whole tractor laterally in relation to the track, for its travel for instance along a portion of the track which is laid so close to a wall or to the parapet of a bridge as to leave insufficient clearance space for the tractor. For this purpose special, manually operative means may be provided to displace either the cylinder or—in cases where the steering cross rod is actuated by a lever such as E in Figs. 14 to 16—the fulcrum of the said lever.

Fig. 11 shows by way of example an arrangement of the latter type in a part-sectional end view, and Fig. 11$^A$ is a detail view thereof. The pivot pin F, instead of being permanently mounted on the frame or axle of the tractor as in the example shown in Figs. 14 to 16, is mounted on a sliding block 30 constituting a traveling nut, adapted to be moved transversely to the tractor by means of a screw spindle 31 mounted in a yoke A' and rotatable by means of a handwheel 32 and bevel gears 33, 34. By shifting the nut 30 with the pin F, the stray of the cylinder C and consequently the position to be assumed by the tractor A in relation to the track can be altered at will.

Fig. 12 shows in a similar view means for attaining the same object, with a steering control of the cable type shown in Fig. 25. In this example the two guide rollers Z' between which the cylinder C$^6$ is interposed in the cable Z are mounted in a frame 35 transversely slidable on a rod 36 secured in brackets 37 attached to the tractor frame A. Any means may be employed to prevent the frame 35 from rocking on the rod 36. In the example shown the flat top bar 35' of the frame is guided by the underside of the longitudinal beams of the chassis. On the top bar 35' is secured a rack 38, which is in mesh with a pinion 39, mounted on a horizontal shaft 40, which may extend through the end of the tractor frame and may be rotated by crank or handwheel or by bevel gearing. Alternatively the rack may be cut in the front or rear side of the bar 35' and the pinion 39 may be mounted on an upright shaft, or both the rack 38 and the shaft 40 with the pinion may be arranged at any convenient angle. In thus displacing the rollers Z$^1$ laterally in one or the other direction, a corresponding pull on the rope Z will displace the cylinder C$^6$ with the same effect on the steering cross rod and, correspondingly, the wheels of the tractors, as described in connection with Figs. 5 and 25, where the pull on that rope is due to the displacement of the cylinder C$^6$ by the pin C$^1$.

Figure 13:
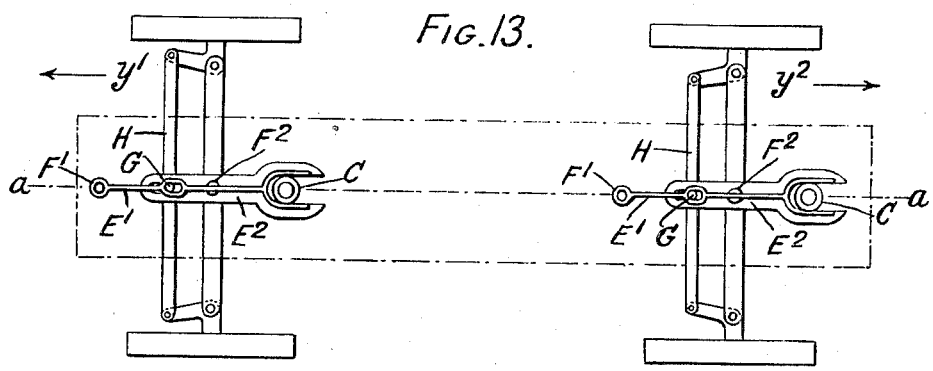
Figure 13A:
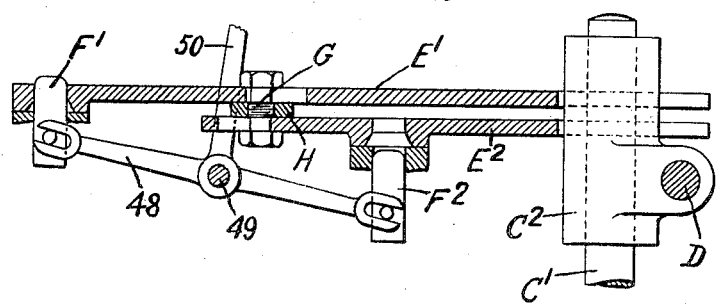

Fig. 13 shows in plan view an example of the arrangement for steering two pairs of wheels of a tractor, and Fig. 13$^A$ is a sectional detail thereof on an enlarged scale.

In this case each pair of wheels is provided with its own entirely independent steering mechanism, for example of the lever type of Figs. 1 and 14 to 16. In order to provide for forward and backward steering, each of these steering sets comprises duplicate control levers E', E$^2$ actuated, however, by one and the same control cylinder C and pivoted at F', F$^2$ respectively at opposite sides of the steering cross rod H, so as to actuate the latter in opposite directions. The arms of the said control levers E', E$^2$ are so proportioned that equal stray of the control cylinder in the forward or backward running of the tractor produces equal transverse movement of the steering cross rod H and consequently the required equal setting of the wheels. Assuming the tractor to run forward in the direction of arrow $y'$ the levers E' pivoted at F' are rendered operative, while for backward steering in the direction of arrow $y^2$ the levers $E^2$ pivoted at $F^2$ are put into action. In order to render one or the other of the levers E', $E^2$ operative and inoperative respectively, the arrangement shown and described in connection with Fig. 3, or alternatively an arrangement such as shown in Fig. $13^A$ may be employed. The pivot pins F' and $F^2$ are fitted axially slidable in the frame members upon which the levers E' and $E^2$ respectively rest, said pins being supported in the forked ends of a two-armed rocking lever 48 mounted on a shaft 49 carrying an operating lever 50 which may suitably be connected to the reversing gear of the tractor. As will be clear from the drawing the withdrawal of one or the other of the pins F' or $F^2$ from engagement with its corresponding lever E' or $E^2$ throws the other into engagement therewith.

In the preceding description the invention has been explained in its bearing and function in connection with the definite problems of steering roadrail vehicles when negotiating curves, but it is evident that any accidental deviations of the road vehicle, caused by skidding, irregularities in the track or the like will be instantaneously corrected by the steering gear and normal positions automatically re-established.

What I claim as new and desire to secure by Letters Patent is:—

1. In a roadrail vehicle embodying a tractor equipped with steering means, and a bogie for automatically steering the tractor along a rail track, a universal joint connection comprising two complemental elements carried one by the tractor and the other by the bogie and so associated with each other as to enable them to perform relative vertical movements, one of said complemental elements being mounted for sliding movement; and means for transmitting such movement to said steering means in properly co-ordinated manner.

2. In a roadrail vehicle embodying a tractor equipped with steering means, and a bogie for automatically steering the tractor along a rail track, a universal joint connection comprising two complemental elements carried one by the tractor and the other by the bogie and so associated with each other as to enable them to perform relative vertical movements, one of said complemental elements being mounted for sliding movement transversely with relation to said tractor; and means for transmitting such movement to said steering means in properly co-ordinated manner.

3. In a roadrail vehicle embodying a tractor equipped with steering means, and a bogie for automatically steering the tractor along a rail track, a universal joint connection comprising two complemental elements carried one by the tractor and the other by the bogie and so associated with each other as to enable them to perform relative vertical movements, one of said complemental elements being mounted for pivotal movement, and the other for sliding movement; and means for transmitting such sliding movement to said steering means in properly co-ordinated manner.

4. In a roadrail vehicle embodying a tractor equipped with steering means, and a bogie for automatically steering the tractor along a rail track, a universal joint connection comprising two complemental elements carried one by the tractor and the other by the bogie and so associated with each other as to enable them to perform relative vertical movements, one of said complemental elements being mounted for rotary movement, and the other for sliding movement transversely with relation to the tractor; and means for transmitting such sliding movement to said steering means in properly co-ordinated manner.

5. In a roadrail vehicle embodying a tractor equipped with steering means, and a bogie for automatically steering the tractor along a rail track, a universal joint connection comprising two complemental elements carried one by the tractor and the other by the bogie, one element being slidable transversely with relation to the tractor, and the other movable vertically in the first one; and means for transmitting such sliding movement to said steering means in properly co-ordinated manner.

6. In a roadrail vehicle embodying a tractor equipped with steering means and a bogie for automatically steering the tractor along a rail track, a universal joint connection comprising a pin carried by the bogie, and a hollow member to receive said pin carried by the tractor and movable transversely with relation to the same, said pin and receiving member performing relative vertical movements; and means for transmitting the movements of the receiving member to said steering means in properly co-ordinated manner.

7. In a roadrail vehicle embodying a tractor equipped with steering means, and a bogie for automatically steering the tractor along a rail track, a universal joint connection comprising a rocking pin carried by the bogie, and a hollow member to receive the pin carried by the tractor and mounted to slide transversely with relation thereto and to swing in a plane at right angles to said pin; and means for transmitting the sliding movements of the receiving member to said steering means in properly co-ordinated manner.

8. In a roadrail vehicle embodying a tractor equipped with steering means, and a bogie for automatically steering the tractor along a rail track, a universal joint connection comprising a pin carried by the bogie, and a hollow member to receive said pin carried by the tractor and movable transversely with relation to the same, said pin and receiving member performing relative vertical and rotary movements; and means for transmitting the transverse movements of the receiving member to said steering means in properly co-ordinated manner.

9. In a roadrail vehicle embodying a tractor equipped with steering means, and a bogie for automatically steering the tractor along a rail track; a universal joint connection comprising two complemental elements carried one by the tractor and the other by the bogie and so associated with each other as to enable them to perform relative vertical movements, one of said complemental members being mounted for sliding movement transversely with relation to the tractor; and a cable connection between said sliding member and said steering means for transmitting the sliding movements of the former to the latter.

10. In a roadrail vehicle embodying a tractor equipped with steering means, and a bogie for automatically steering the tractor along a rail track, a universal joint connection comprising a vertically-movable member carried by the bogie, and a hollow receiving member for the vertically-movable member and adapted to be moved by the same transversely of the tractor, said receiving member being carried by said tractor; and a cable connection between the receiving member and the steering means for transmitting to the latter the transverse movements of the former.

11. In a roadrail vehicle embodying a tractor equipped with steering means, and two bogies, one fore and one aft, for automatically steering the tractor along a rail track, a universal joint connection between each of said bogies and the tractor comprising two complemental members so associated with each other as to enable them to perform relative vertical movements, one of said complemental members being carried by the tractor and being mounted for sliding movement relatively thereto and the other being mounted on the respective bogie; a flexible connection between each of said sliding members and the steering means for transmitting the sliding movements of the former to the latter; and means for rendering at the same time one of said connections operative and the other inoperative.

12. In a roadrail vehicle embodying a tractor equipped with steering means, and two bogies, one fore and one aft, for automatically steering the tractor along a rail track, a universal joint connection between each of said bogies and the tractor comprising a vertical pin carried by each bogie, and a hollow member on the tractor receiving the said pin and movable relatively thereto in a vertical direction and mounted for movement transversely of the tractor; a cable connection between each hollow member and the steering means for transmitting the movements of the former to the latter; and means whereby either of said cable connections may be rendered inoperative and the other connection at the same time brought into action.

In testimony whereof I have signed my name this 23rd day of November, 1926.

JOHN ROBERTS.